US008682258B2

(12) United States Patent
Fukamachi et al.

(10) Patent No.: US 8,682,258 B2
(45) Date of Patent: Mar. 25, 2014

(54) HIGH-FREQUENCY CIRCUIT, HIGH-FREQUENCY DEVICE, AND COMMUNICATION APPARATUS

(75) Inventors: Keisuke Fukamachi, Kumagaya (JP); Shigeru Kemmochi, Fukaya (JP); Hirotaka Satake, Kumagaya (JP)

(73) Assignee: Hitachi Metals, Ltd., Tokyo (JP)

( * ) Notice: Subject to any disclaimer, the term of this patent is extended or adjusted under 35 U.S.C. 154(b) by 558 days.

(21) Appl. No.: 11/738,975

(22) Filed: Apr. 23, 2007

(65) Prior Publication Data
US 2008/0166980 A1     Jul. 10, 2008

(30) Foreign Application Priority Data

| Apr. 26, 2006 | (JP) | 2006-121502 |
| Mar. 7, 2007 | (JP) | 2007-056711 |
| Mar. 16, 2007 | (JP) | 2007-068870 |

(51) Int. Cl.
*H04B 1/38* (2006.01)

(52) U.S. Cl.
USPC ........... 455/73; 455/193.1; 455/269; 370/343

(58) Field of Classification Search
USPC ................. 455/73, 193.1, 269; 370/343
See application file for complete search history.

(56) References Cited

U.S. PATENT DOCUMENTS

| 3,296,535 | A | * | 1/1967 | Murray | 455/336 |
| 5,075,670 | A | * | 12/1991 | Bower et al. | 340/573.4 |
| 5,906,820 | A | | 5/1999 | Bacha | |
| 6,380,608 | B1 | * | 4/2002 | Bentley | 257/531 |
| 6,801,088 | B2 | | 10/2004 | Allen et al. | |
| 6,903,656 | B1 | * | 6/2005 | Lee | 340/572.1 |
| 7,251,459 | B2 | | 7/2007 | McFarland et al. | |
| 2004/0087286 | A1 | | 5/2004 | Inoue et al. | |
| 2004/0127182 | A1 | * | 7/2004 | Hayashi | 455/193.1 |
| 2004/0198237 | A1 | * | 10/2004 | Abutaleb et al. | 455/78 |
| 2004/0266378 | A1 | * | 12/2004 | Fukamachi et al. | 455/188.1 |
| 2005/0136846 | A1 | * | 6/2005 | Kim et al. | 455/78 |
| 2006/0087387 | A1 | * | 4/2006 | Kubota et al. | 333/204 |
| 2008/0212552 | A1 | | 9/2008 | Fukamachi et al. | |

FOREIGN PATENT DOCUMENTS

| CN | 2075402 U | 4/1991 |
| EP | 1401045 A1 | 3/2004 |
| JP | 08-316870 A | 11/1996 |
| JP | 2002-208874 A | 7/2002 |

(Continued)

OTHER PUBLICATIONS

European Patent Office, "Communication and Partial Search Report," issued in connection with European Patent Application No. 07008138.5, dated Sep. 28, 2011.

(Continued)

*Primary Examiner* — Edward Urban
*Assistant Examiner* — Hsin-Chun Liao
(74) *Attorney, Agent, or Firm* — Sughrue Mion, PLLC

(57) ABSTRACT

A high-frequency circuit comprising a switch circuit connected to an antenna terminal, first and second diplexer circuits connected to the switch circuit, first and second power amplifier circuits connected to the first diplexer circuit, first and second bandpass filter circuits connected to the first and second power amplifier circuits, a third bandpass filter circuit connected to the second diplexer circuit, a detection circuit disposed between the switch circuit and the first diplexer circuit, and a low-noise amplifier circuit disposed between the switch circuit and the second diplexer circuit.

9 Claims, 15 Drawing Sheets

(56) References Cited

FOREIGN PATENT DOCUMENTS

| | | |
|---|---|---|
| JP | 2002-335187 A | 11/2002 |
| JP | 2003-152588 A | 5/2003 |
| JP | 2003-273687 A | 9/2003 |
| JP | 2004-072586 A | 3/2004 |
| JP | 2004-312363 A | 11/2004 |
| JP | 2005-260837 A | 9/2005 |
| JP | 2005-269305 A | 9/2005 |
| JP | 2006-109257 A | 4/2006 |
| JP | 2006-304081 A | 11/2006 |
| WO | 2006/003959 A | 1/2006 |
| WO | WO 2006-003959 A1 | 1/2006 |

OTHER PUBLICATIONS

Guo, Zehng Yi, "Design of Flat Gain of 45-960 MHz Band-Limited Amplifier," Television Technology, 1989, 5th, pp. 30-35.

Chinese Office Action issued in Chinese Application No. 200710100893.7 dated Jan. 31, 2012 (translation only) (3 pages).

* cited by examiner

HIGH-FREQUENCY CIRCUIT, HIGH-FREQUENCY DEVICE, AND COMMUNICATION APPARATUS

FIELD OF THE INVENTION

The present invention relates to a high-frequency circuit adapted to at least two communications systems usable for wireless communications among electronic/electric apparatuses, and a high-frequency device comprising such a high-frequency circuit and a communications apparatus comprising it.

BACKGROUND OF THE INVENTION

Data communications by wireless LAN such as IEEE802.11 are now widely used, for instance, in personal computers (PCs), PC peripherals such as printers, hard disk drives and broadband rooters, electronic apparatuses such as FAXs, refrigerators, standard televisions (SDTVs), high-definition televisions (HDTVs), digital cameras, digital video cameras and mobile phones, signal-transmitting means in automobiles and aircrafts, etc.

As the wireless LAN standard, IEEE802.11a uses an orthogonal frequency division multiples (OFDM) modulation system in a frequency band of 5 GHz, supporting high-speed data communications of maximum 54 Mbps. IEEE802.11b uses a direct sequence spread spectrum (DDSs) system in an industrial, scientific and medical (ISM) band of 2.4 GHz usable without a wireless license, supporting high-speed communications of 5.5 Mbps and 11 Mbps, IEEE802.11g uses the OFDM modulation system in a 2.4-GHz band like IEEE802.11b, supporting high-speed data communications of maximum 54 Mbps. Taking for example a case where a first communications system (11$bg$) is IEEE802.11b and IEEE802.11g, and a second communications system (11$a$) is IEEE802.11a, if necessary, explanation will be made below.

As a high-frequency circuit for use in a multi-band communications apparatus using such wireless LAN, WO2006/003959A discloses a high-frequency circuit capable of performing diversity receiving, which comprises two dual-band antennas capable of transmitting and receiving signals in two communications systems (IEEE802.11a, IEEE802.11b) with different communications frequency bands, a high-frequency switch having four ports for switching the connection of a transmitting circuit and a receiving circuit, a first diplexer circuit disposed between one port of the high-frequency switch and the transmitting circuit, and a second diplexer circuit disposed between the other port of the high-frequency switch and the receiving circuit.

The high-frequency circuit shown in FIG. 26 of WO2006/003959A is shown in FIG. 21. This high-frequency circuit comprises a diplexer circuit 13 between a high-frequency switch circuit 10 and a transmitting circuit, a power amplifier circuit 2 and a bandpass filter circuit 4 between the diplexer circuit 13 and a transmitting terminal 11$bg$-T; a lowpass filter circuit 19, a power amplifier circuit 3 and a bandpass filter circuit 5 between the diplexer circuit 13 and a transmitting terminal 11$a$-T; a detection circuit 8 between the high-frequency switch circuit 10 and the diplexer circuit 13, a diplexer circuit 14 between the high-frequency switch circuit 10 and a receiving circuit, a bandpass filter circuit 6 between the diplexer circuit 14 and a receiving terminal 11$bg$-R; a lowpass filter circuit 26 and a low-noise amplifier circuit 27 between the diplexer circuit 14 and a receiving terminal 11$a$-R; a notch circuit 28 between an antenna terminal Ant1 and the high-frequency switch circuit; and a notch circuit 29 between an antenna terminal. Ant2 and the high-frequency switch circuit 10. Although this high-frequency circuit comprises a low-noise amplifier circuit 27 in a receiving path (11$a$-R) of a 5-GHz band, a low-noise amplifier circuit of a 2.4-GHz band should be disposed separately, thereby being not suitable for miniaturization.

Because the diplexer circuit is connected to the input side of the low-noise amplifier, with a bandpass filter or a lowpass filter disposed between the diplexer circuit and the low-noise amplifier in WO2006/003959A, the receiving sensitivity is largely affected by the noise index of the low-noise amplifier and the insertion loss of the bandpass filter or the lowpass filter and the diplexer circuit. Accordingly, when a bandpass filter or a lowpass filter having insertion loss of about 2 dB is used, or when a diplexer circuit having insertion loss of about 1 dB is used on the input side of the low-noise amplifier, the receiving sensitivity is limited.

As a circuit commonly usable for wireless LAN and Bluetooth, JP2002-208874A discloses a circuit comprising a bandpass filter between an antenna and an antenna switch; a power amplifier commonly usable for wireless LAN and Bluetooth on the transmitting side of the antenna switch; a diplexer connected to the power amplifier to branch the transmission of wireless LAN and Bluetooth; a low-noise amplifier commonly usable for the receiving of wireless LAN and Bluetooth on the receiving side of the antenna switch; and a diplexer connected to the low-noise amplifier to branch the receiving of wireless LAN and the receiving of Bluetooth. As shown in FIG. 22, JP2002-208874A describes an example in which a frequency-selecting diplexer is constituted by a combination of a lowpass matching circuit and a highpass matching circuit. Though this circuit achieves the reduction of harmonics on the transmitting and receiving sides by one bandpass filter, it cannot be used in two frequency bands of a 2.4-GHz band and a 5-GHz band, and its receiving sensitivity is limited because it comprises a bandpass filter and a diplexer circuit on the input side of the low-noise amplifier.

Further, wireless LAN communications apparatuses adapted to IEEE802.11n to improve the speed and quality of communications by using pluralities of antennas according to a multi-input-multi-output (MIMO) technology have been becoming popular. However, the high-frequency circuits of WO2006/003959A and JP2002-208874A fail to satisfactorily handle IEEE802.11n.

OBJECTS OF THE INVENTION

Accordingly, an object of the present invention is to provide a small high-frequency circuit having good receiving sensitivity, which can be used for dual-band wireless apparatuses.

Another object of the present invention is to provide a high-frequency device comprising such a high-frequency circuit.

A further object of the present invention is to provide a communications apparatus comprising such a high-frequency device.

DISCLOSURE OF THE INVENTION

The high-frequency circuit of the present invention for use in a dual-band wireless apparatus performing wireless communications selectively using first and second frequency bands, comprises:

an antenna terminal connected to an antenna capable of transmitting and receiving signals in the first and second frequency bands;

a first transmitting terminal to which a transmitting signal in the first frequency band is inputted, a second transmitting terminal to which a transmitting signal in the second frequency band is inputted, a first receiving terminal outputting a received signal in the first frequency band, and a second receiving terminal outputting a received signal in the second frequency band;

a switch circuit for switching the connection of the antenna terminal to the first and second transmitting terminals or the first and second receiving terminals;

a first diplexer circuit disposed between the switch circuit and the first and second transmitting terminals, and a second diplexer circuit disposed between the switch circuit and the first and second receiving terminals;

a first power amplifier circuit disposed between the first diplexer circuit and the first transmitting terminal, and a second power amplifier circuit disposed between the first diplexer circuit and the second transmitting terminal;

a first bandpass filter circuit disposed between the first power amplifier circuit and the first transmitting terminal, a second bandpass filter circuit disposed between the second power amplifier circuit and the second transmitting terminal, and a third bandpass filter circuit disposed between the second diplexer circuit and the first receiving terminal;

a detection circuit disposed between the switch circuit and the first diplexer circuit; and a low-noise amplifier circuit disposed between the switch circuit and the second diplexer circuit.

Because the input side of the low-noise amplifier circuit disposed between the switch circuit and the second diplexer circuit is connected to the switch circuit without passing through a diplexer circuit, insertion loss on the input side drastically decreases, resulting in remarkable improvement in receiving sensitivity. Also, because the detection circuit disposed between the switch circuit and the first diplexer circuit can detect transmitting signals, for instance, in two bands of 2.4 GHz and 5 GHz, the high-frequency circuit can be made smaller in size and lower in cost.

A lowpass filter circuit is preferably disposed between the first diplexer circuit and the second power amplifier circuit. The lowpass filter circuit can reduce harmonics generated by the power amplifier circuit.

A harmonics-reducing circuit is preferably disposed between the switch circuit and the antenna terminal. The harmonics-reducing circuit reduces harmonics generated by the power amplifier circuit.

At least one of the first to third bandpass filter circuits preferably comprises first and second inductance elements magnetically coupled to each other, and first and second capacitors each constituting a parallel circuit with each of the first and second inductance elements, the first and second inductance elements being grounded via a third inductance element. The first and second inductance elements magnetically coupled to each other and the first and second capacitors each constituting a parallel circuit with each of the first and second inductance elements provides a bandpass filter circuit that has low loss in a passband and high attenuation outside the communications band. In addition, a bandwidth can be increased by grounding the first and second inductance elements via the third inductance element, enabling use even in a relatively wide 5-GHz band (4.9-5.85 GHz).

Said low-noise amplifier circuit preferably comprises a transistor, an input path connected to a base of the transistor, an output path connected to a collector of the transistor, and a feedback circuit having a resistor, an inductance element and a capacitor in series between a node of the input path and a node of the output path. This structure makes the low-noise amplifier circuit operable in a wide band.

Said low-noise amplifier circuit preferably comprises a transistor, an input path connected to a base of the transistor, an output path connected to a collector of the transistor, a feedback circuit having a resistor between a node of the input path and a node of the output path, and a capacitor disposed between the node of the input path and the base of the transistor. This structure flattens the gain characteristics of the low-noise amplifier circuit.

Said feedback circuit preferably comprises an inductance element in series to the resistor. Because an inductance element has large impedance in a high frequency range, the amount of feedback can be reduced more in a high frequency range than in a low frequency range, resulting in increased gain characteristics in a high frequency range, which further flattens the gain characteristics relative to frequency.

An emitter of the transistor is preferably grounded via an inductance element. Such inductance element contributes to the adjustment of gain.

A variable notch filter circuit is preferably connected between the switch circuit and the low-noise amplifier circuit, such that it passes a signal in the first frequency band when the signal in the first frequency band is received, and blocks the signal in the first frequency band when a signal in the second frequency band is received. This structure prevents signals in different frequency bands entering into the low-noise amplifier circuit from interfering with each other to generate distortion.

The high-frequency device of the present invention for use in a dual-band wireless apparatus performing wireless communications selectively using first and second frequency bands, having a high-frequency circuit comprising:

an antenna terminal connected to an antenna capable of transmitting and receiving signals in the first and second frequency bands;

a first transmitting terminal to which a transmitting signal in the first frequency band is inputted, a second transmitting terminal to which a transmitting signal in the second frequency band is inputted, a first receiving terminal outputting a received signal in the first frequency band, and a second receiving terminal outputting a received signal in the second frequency band;

a switch circuit for switching the connection of the antenna terminal to the first and second transmitting terminals or the first and second receiving terminals;

a first diplexer circuit disposed between the switch circuit and the first and second transmitting terminals, and a second diplexer circuit disposed between the switch circuit and the first and second receiving terminals;

a first power amplifier circuit disposed between the first diplexer circuit and the first transmitting terminal, and a second power amplifier circuit disposed between the first diplexer circuit and the second transmitting terminal;

a first bandpass filter circuit disposed between the first power amplifier circuit and the first transmitting terminal, a second bandpass filter circuit disposed between the second power amplifier circuit and the second transmitting terminal, and a third bandpass filter circuit disposed between the second diplexer circuit and the first receiving terminal;

a detection circuit disposed between the switch circuit and the first diplexer circuit; and a low-noise amplifier circuit disposed between the switch circuit and the second diplexer circuit;

the high-frequency device comprising an integral laminate constituted by pluralities of dielectric ceramic layers each provided with electrode patterns, and elements mounted on a surface of the laminate, the electrode patterns constituting at least the first and second diplexer circuits and the first to third bandpass filter circuits, and the mounted elements comprising semiconductor elements for the switch circuit, the first and second power amplifier circuits and the low-noise amplifier circuit.

The above structure makes the high-frequency device of the present invention small, and minimizes its insertion loss occurring by wiring resistance.

Said high-frequency circuit preferably comprises a lowpass filter circuit between the first diplexer circuit and the second power amplifier circuit, the lowpass filter circuit being constituted by the electrode patterns in the laminate.

Said high-frequency circuit in the high-frequency device preferably comprises a harmonics-reducing circuit between the switch circuit and the antenna terminal, the harmonics-reducing circuit being constituted by the electrode patterns in the laminate.

Said laminate has a mounting surface of 7 mm or less in each side.

Electrode patterns for the second diplexer circuit and the third bandpass filter circuit are preferably disposed in a region sandwiched by upper and lower ground electrode patterns in the laminate, pluralities of via-hole electrodes connected to the upper and lower ground electrode patterns being arranged in a line between the region and the other region, so that the ground electrode patterns and the via-hole electrodes prevent the electrode patterns in the region from interfering with those in the other region, It is preferable that a semiconductor element for the low-noise amplifier is mounted on an upper surface of the laminate substantially just above a region having electrode patterns for the second diplexer circuit and the third bandpass filter circuit, and that a ground electrode pattern is formed between the semiconductor element for the low-noise amplifier and the electrode patterns for the third bandpass filter circuit.

It is preferable that a coupler circuit in the detection circuit is formed in the laminate, that an electrode pattern for a main line of the coupler circuit and an electrode pattern for a sub-line of the coupler circuit are vertically opposing in a lamination direction, and sandwiched by upper and lower ground electrode patterns, and that the electrode pattern for the main line and the electrode pattern for the sub-line are surrounded by pluralities of via-hole electrodes connected to the upper and lower ground electrode patterns.

The communications apparatus of the present invention comprises the above high-frequency device.

DESCRIPTION OF THE BEST MODE OF THE INVENTION

[1] High-Frequency Circuit

Figure 1:
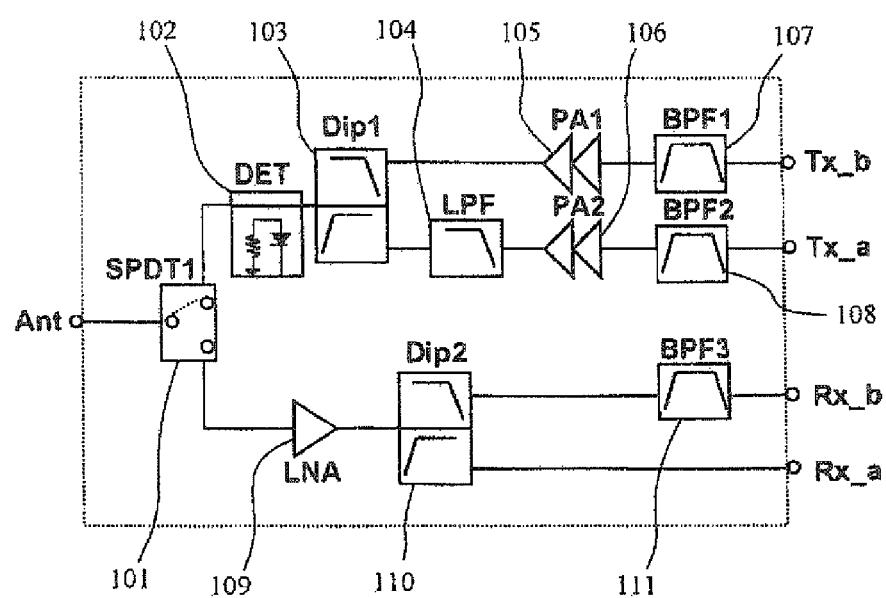
FIG. 1 is a block diagram showing a high-frequency circuit according to one embodiment of the present invention.

The high-frequency circuit of the present invention uses first and second frequency bands selectively. In general, the second frequency band is higher than the first frequency band FIG. 1 shows a high-frequency circuit according to one embodiment of the present invention, which can be commonly used in two communications systems for wireless LAN in the first frequency band (2.4-GHz-band) (IEEE802.11b and/or IEEE802.11g) and wireless LAN in the second frequency band (5-GHz-band) (IEEE802.11a and/or IEEE802.11h). This high-frequency circuit comprises a switch circuit (SPDT1) 101 connected to an antenna terminal Ant which is to be connected to a multi-band antenna, a detection circuit (DET) 102 connected to the transmitting path side of the switch circuit (SPDT1) 101, and a first diplexer circuit (Dip1) 103 connected to the detection circuit (DET) 102.

The first diplexer circuit (Dip1) 103 is constituted by a low-frequency filter circuit and a high-frequency filter circuit. The low-frequency filter circuit passes a transmitting signal for 2.4-GHz-band wireless LAN, but attenuates a transmitting signal for 5-GHz-band wireless LAN. The high-frequency filter circuit passes a transmitting signal for 5-GHz-band wireless LAN, but attenuates a transmitting signal for 2.4-GHz-band wireless LAN.

The low-frequency filter circuit in the first diplexer circuit (Dip1) 103 is connected to a first power amplifier circuit (PA1) 105, which is connected to a first bandpass filter circuit (BPF1) 107, which is then connected to the transmitting terminal Tx-b for 2.4-GHz-band wireless LAN. The bandpass filter circuit (BPF1) 107 removes off-band noise from the transmitting signal, the first power amplifier circuit (PA1) 105 amplifies a transmitting signal inputted from a transmitting circuit for 2.4-GHz-band wireless LAN, and the low-frequency filter circuit in the first diplexer circuit (Dip1) 103 attenuates harmonics generated by the first power amplifier circuit (PA1) 105.

The high-frequency filter circuit in the first diplexer circuit (Dip1) 103 is connected to a lowpass filter (LPF) 104, which is connected to the second power amplifier circuit (PA2) 106, which is connected to the second bandpass filter circuit (BPF2) 108, which is connected to the transmitting terminal Tx-a for 5-GHz-band wireless LAN. The bandpass filter circuit (BPF2) 108 removes off-band noise from the transmitting signal, the second power amplifier circuit (PA2) 106 amplifies a transmitting signal inputted from the transmitting circuit for 5-GHz-band wireless LAN, and the lowpass filter (LPF) 104 passes the amplified transmitting signal, but attenuates harmonics generated by the second power amplifier circuit (PA2) 106.

The receiving path side of the switch circuit (SPDT1) 101 is connected to a low-noise amplifier circuit (LNA) 109 and then to a second diplexer circuit (Dip2) 110. The low-noise amplifier circuit (LNA) 109 amplifies received signals for 2.4-GHz-band wireless LAN and 5-GHz-band wireless LAN. The low-noise amplifier desirably covers such a wide band that the received signals for wireless LAN of a 2.4-GHz band and a 5-GHz band can be amplified. With the diplexer circuit (Dip2) for branching the first frequency band (2.4-GHz band) and the second frequency band (5-GHz band) disposed downstream of the low-noise amplifier circuit DNA), two low-noise amplifiers are not needed unlike the conventional circuit structures, thereby making the high-frequency circuit smaller in size and lower in cost. Further, because a diplexer circuit and a bandpass circuit need not be arranged on the input side of the low-noise amplifier, receiving sensitivity can be increased.

The second diplexer circuit (Dip2) 110 is constituted by a low-frequency filter circuit and a high-frequency filter circuit. The low-frequency filter circuit passes a received signal for 2.4-GHz-band 1.5 wireless LAN, but attenuates a received signal for 5-GHz-band wireless LAN. The high-frequency filter circuit passes a received signal for 5-GHz-band wireless LAN, but attenuates a received signal for 2.4-GHz-band wireless LAN, A signal amplified by the low-noise amplifier (LNA) 109 is branched by the second diplexer circuit (Dip2) 110 to a received signal for 2.4-GHz-band wireless LAN, which is output to a receiving terminal Rx-b for 2.4-GHz-band wireless LAN through a third bandpass filter circuit (BPF3) 111, and to a received signal for 5-GHz-band wireless LAN, which is output to a receiving terminal Rx-a for 5-GHz-band wireless LAN.

Though the detection circuit (DET) 102 may be disposed between the first diplexer circuit 103 and each of the power amplifier circuits 105, 106, it needs two detection circuits, unsuitable for size reduction. The detection circuit may be disposed in each power amplifier circuit 105, 106. In the detection circuit (DET) 102, a high-frequency power is detected by a detecting diode based on a transmitting signal detected by the coupler. A detected signal is fed back via an RFIC circuit, etc., to be used for controlling the power amplifier circuits 105, 106.

To pass a transmitting signal amplified by the first power amplifier circuit (PA 1) 105 and attenuate harmonics generated by the first power amplifier circuit (PA 1) 105, a low pass filter circuit may be disposed between the first diplexer circuit 103 and the first power amplifier circuit (PA1) 105. A bandpass filter circuit may also be disposed between the second diplexer circuit (Dip2) 110 and the receiving terminal Rx-a for 5-GHz-band wireless LAN.

Figure 2:
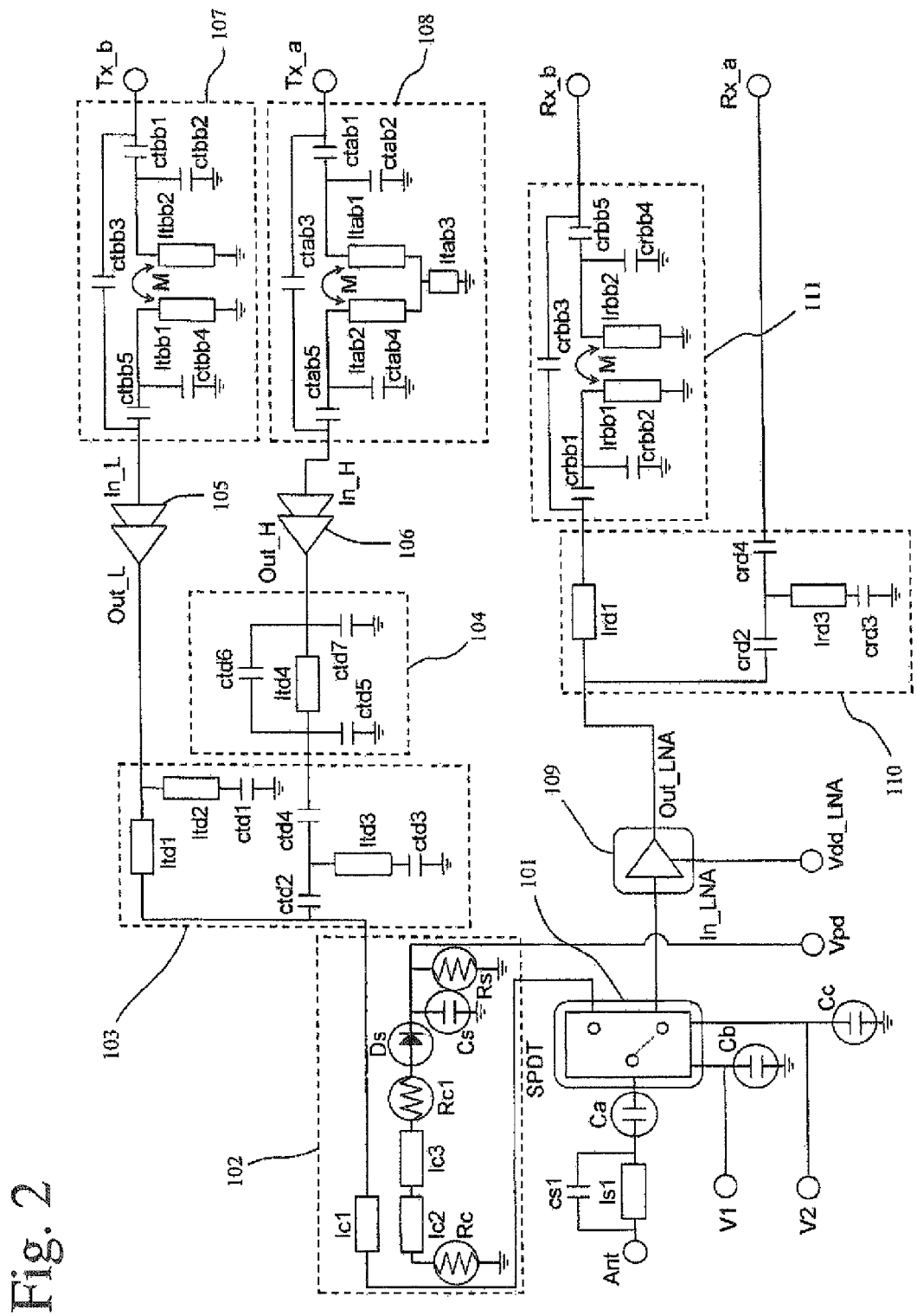
FIG. 2 is a view showing one example of the equivalent circuit of the high-frequency circuit of FIG. 1.

FIG. 2 exemplifies the equivalent circuit of the high-frequency circuit shown in FIG. 1. The switch circuit 101 comprises a switching element such as a field-effect transistor (FET), a diode, etc. as a main component, and optionally inductance elements and capacitors, preferably a single-pole, dual-throw (SPDT) type, for instance.

A harmonics-reducing circuit constituted by a resonance circuit comprising an inductance element ls1 and a capacitor cs1 is disposed between the switch circuit 101 and the antenna terminal Ant. This harmonics-reducing circuit may be constituted by a lowpass filter, a notch filter, a combination of an inductance element and a shunt capacitor, etc. When the harmonics-reducing circuit is constituted by a lowpass filter, large attenuation can be obtained in a wide frequency band higher than the passband, but relatively large insertion loss and a large circuit size ensue. When the harmonics-reducing circuit is constituted by a notch filter, smaller insertion loss is obtained than when the lowpass filter is used, but attenuation can be obtained only at a particular resonance frequency. When it is a combination of an inductance element and a shunt capacitor, insertion loss is suppressed, but smaller attenuation is obtained than when the lowpass filter or the notch filter is used. Accordingly, the structure of the harmonics-reducing circuit is selected, taking into consideration the necessary amount of attenuation, insertion loss, circuit size, etc. The harmonics-reducing circuit can reduce first harmonics generated by the detection circuit and second harmonics generated by the low-noise amplifier circuit (LNA) 109 on the receiving side.

The first diplexer circuit 103 comprises a lowpass filter circuit constituted by inductance elements ltd1 ltd2 and a capacitor ctd1, and a highpass filter circuit constituted by an inductance element ltd3 and capacitors ctd2-ctd4. The second diplexer circuit 110 comprises a lowpass filter circuit constituted by an inductance element lrd1, and a highpass filter circuit constituted by an inductance element ldr3 and capacitors crd2-crd4. The strictures of these diplexer circuits may be not only combinations of lowpass fitter circuits and highpass filter circuits, but also combinations of various filter circuits.

The first bandpass filter circuit 107 is constituted by magnetically coupled inductance elements ltbb1, ltbb2, and capacitors ctbb1-ctbb5. The resonance frequency of a parallel circuit constituted by an inductance element ltbb1 and a capacitor ctbb4, and the resonance frequency of a parallel circuit constituted by an inductance element ltbb2 and a capacitor ctbb2 are set such that they are within the transmitting frequency for 2.4-GHz-band wireless LAN.

The second bandpass filter 108 is constituted by magnetically coupled inductance elements ltab1-ltab3, and capacitors ctab1-ctab5. The resonance frequency of a parallel circuit constituted by an inductance element ltab1 and a capacitor ctab2, and the resonance frequency of a parallel circuit constituted by an inductance element ltab2 and a capacitor ctab4 are set such that they are within the transmitting frequency for 5-GHz-band wireless LAN. The inductance elements ltab1 and ltab2 are grounded via the inductance element ltab3. This structure provides large passband width, resulting in a bandpass filter capable of being used in a relatively wide 5-GHz band (4.9-5.85 GHz), The third bandpass filter circuit 111 is constituted by magnetically coupled inductance elements lrbb1, lrbb2, and capacitors crbb1-crbb5. The resonance frequency of a parallel circuit constituted by an inductance element lrbb1 and a capacitor crbb2, and the resonance frequency of a parallel circuit constituted by an inductance element lrbb2 and a capacitor crbb4 are set such that they are within the receiving frequency for 2.4-0 Hz-band wireless LAN.

The lowpass filter circuit 104 comprises a parallel circuit constituted by an inductance element ltd4 and a capacitor ctd6, and capacitors ctd5, ctd7 forming capacitance with the ground. The resonance frequency of a parallel circuit constituted by an inductance element ltd4 and a capacitor ctd6 is set such that it is 2-3 times the transmitting frequency for 5-0 Hz-band wireless LAN.

The detection circuit 102 disposed between the switch circuit 101 and the first diplexer circuit 103 comprises a coupler circuit, a matching circuit, a harmonics-reducing circuit, a Schottky diode, and a voltage-smoothing circuit. The coupler circuit is a directional coupler comprising a main line lc1, a sub-line lc2, and a terminal resistor Rc. Incidentally, the coupler circuit may be constituted by capacitors. A transmission line lc3 as the matching circuit, and a resistor Rc1 as the harmonics-reducing circuit are connected between the coupler circuit and a Schottky diode Ds. The Schottky diode Ds is connected to a detection output terminal Vpd via a voltage-smoothing circuit comprising a capacitor Cs and a resistor Rs. DC voltage based on the output power of the first or second power amplifier circuit 105, 106 is output from the detection) output terminal Vpd.

Figure 3A:
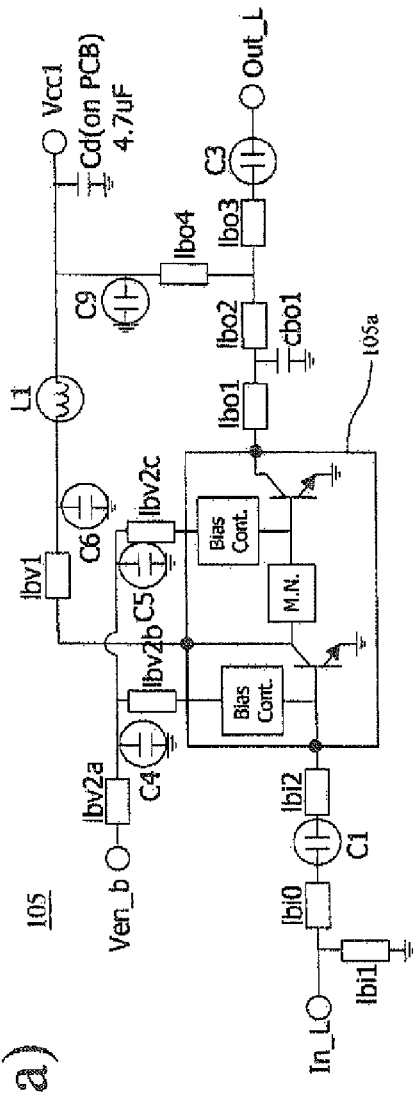
FIG. 3(a) is a view showing the equivalent circuit of a first power amplifier circuit used in the high-frequency circuit of the present invention.
Figure 3B:
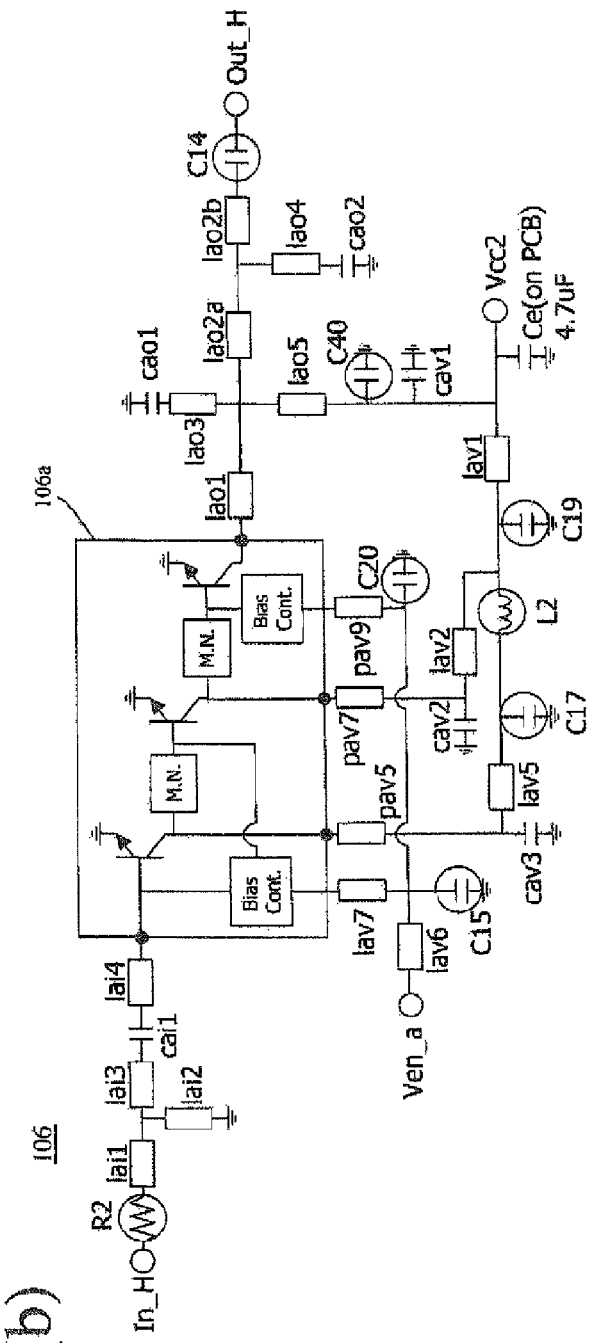
FIG. 3(b) is a view showing the equivalent circuit of a second power amplifier circuit used in the high-frequency circuit of the present invention.

In this equivalent circuit, the main circuits (power-amplifying parts) of the first and second power amplifier circuits 105, 106 are constituted in semiconductor elements. The equivalent circuits of the first and second power amplifier circuits 105, 106 are shown in FIGS. 3(*a*) and (3*b*).

The first power amplifier circuit 105 comprises a two-stage amplifier circuit constituted by a semiconductor element 105*a*, an input-matching circuit comprising inductance elements lbi1, lbi0, lbi2 and a capacitor C1 and connected to an input terminal In-L, an output-matching circuit comprising inductance elements lbo1-lbo4 and capacitors cbo1, C3, C9 and connected to an output terminal Out-L, a bias control circuit comprising inductance elements lbv2*a*, lbv2*b*, lbv2*c* and capacitors C4, C5 and connected to a bias control terminal Ven-b, and a voltage-applying circuit comprising inductance elements lbv1, L1 and capacitors C6, Cd and connected to a voltage-applying terminal Vcc1.

The second power amplifier circuit 106 comprises a three-stage amplifier circuit constituted by a semiconductor elements 106*a*, an input-matching circuit comprising inductance elements lai1-lai4, a capacitor cai1, and a resistor R2 and connected to an input terminal In-H, an output-matching circuit comprising inductance elements lao1-lao5, and capacitors cao1, cao2, C14, C40 and connected to an output terminal Out-H, a bias control circuit comprising inductance elements lav6, lav7, pav9 and capacitors C15, C20 and connected to a bias control terminal Ven-a and a voltage-applying circuit comprising inductance elements lav1, lav2, pav7, L2, Lav5, pav5, and capacitors cav1-cav3, C17, C19, Ce and connected to a voltage-applying terminal Vcc2.

Figure 4:
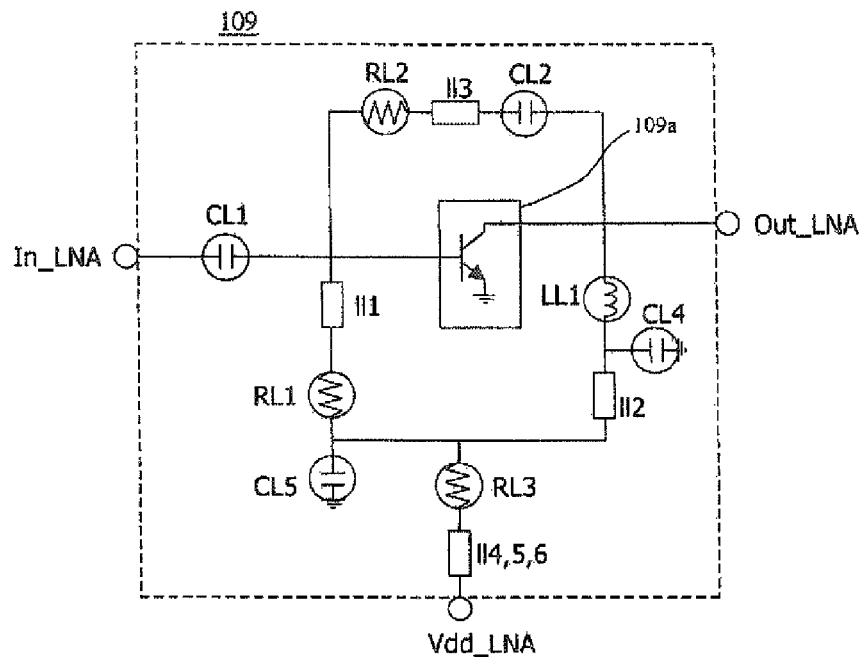
FIG. 4 is a view showing the equivalent circuit of one example of the low-noise amplifier circuit used in the high-frequency circuit of the present invention.

FIG. 4 shows the equivalent circuit of a low-noise amplifier circuit 109. The low-noise amplifier circuit 109 comprises a main circuit (amplifier circuit) constituted by a semiconductor element (transistor) 109*a*, parts arranged around the main circuit, which comprises inductance elements 111-116, LL1, capacitors CL1, CL2, CL4, CL5, and resistors RL1-RL3, and a control voltage terminal Vdd-LNA. The capacitors CL1, CL2 cut DC current, the resistors RL1, RL3 adjust the operating point of the low-noise amplifier, and the inductance element LL1 acts as a choke inductor permitting DC current to be supplied from the power source Vdd-LNA but preventing a high-frequency signal in a passband from leaking to the power source. The resistor RL2 performs input/output matching in a wide band by feedbacking part of an output signal to the input. As shown in FIG. 4, this feedback circuit, which is connected between the node of the input path connected to a base of the transistor 109*a* and the node of the output path connected to a collector of the transistor 109*a*, comprises a resistor RL2, an inductance element 113 and a capacitor CL2 in series. The capacitors CL4, CL5 are noise-cutting capacitors absorbing noise from the power source line. To prevent oscillation by part of a high-frequency signal flowing into the power source, the impedance of the capacitors CL4, CL5 is preferably set such that there is substantially short-circuiting in a passband frequency, In place of the low-noise amplifier circuit 109 shown in FIG. 4, a low-noise amplifier circuit having the structure shown in FIG. 5 may be used. The low-noise amplifier circuit shown in FIG. 5 comprises a transistor 1, an input path connected to a base of the transistor 1, an output path connected to a collector of the transistor 1, and a feedback circuit for feedbacking part of the output to the input to achieve input/output matching in a wide band. The feedback circuit comprises a resistor RL12 between the node 2 of the output path extending between the output terminal Out-LNA and the collector, and the node 3 of the input path extending between the input terminal IN-LNA and the base. Further, a capacitor CL11 is connected between the node 3 and the base of the transistor 1.

Figure 5:
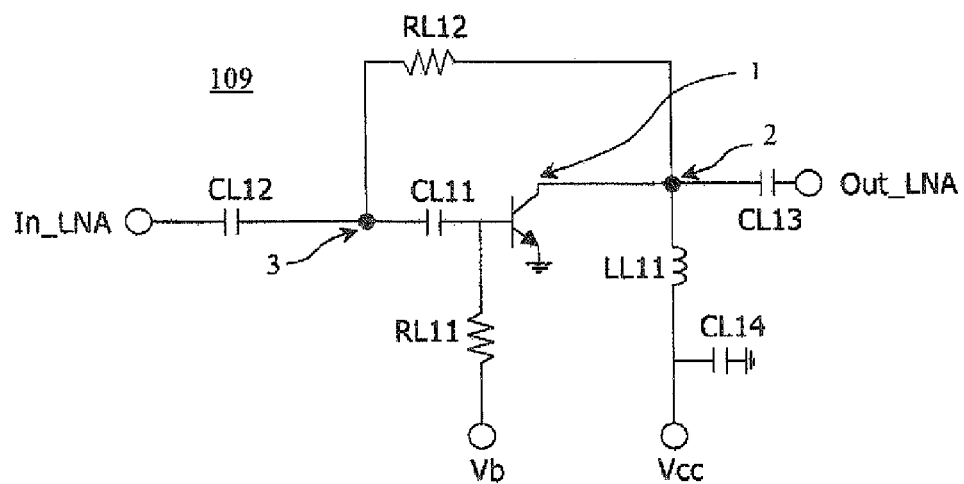
FIG. 5 is a view showing the equivalent circuit of another example of the low-noise amplifier circuit used in the high-frequency circuit of the present invention.

Because the amount of feedback is determined only by the resistor RL12 in the low-noise amplifier circuit shown in FIG. 5, the capacitor CL11 need not have large capacitance. The capacitor CL11 may have as low capacitance as about 2 pF, for instance, in a 2.4-GHz band. This enables the capacitor CL11 to be used as part of the matching circuit. The capacitor CL11 having small capacitance can shorten signal-rising time by ON/OFF control by the base voltage of the transistor. On the contrary, in the conventional low-noise amplifier circuit shown in FIG. 23, the capacitor CL11 series-connected to the resistor RL12 in the feedback circuit should have capacitance of about 15 pF, for instance, in a 2-6 GHz band, to separate voltage on the base side from voltage on the collector base, thereby feedbacking a passband signal from the output side of the low-noise amplifier circuit to the input side.

Further, as shown in FIG. 5, the capacitor CL11 connected between the node 3 and the base of the transistor 1 flattens the gain characteristics of the low-noise amplifier circuit, Namely, because the impedance of the capacitor CL11 having appropriate capacitance is large at a low frequency and small at a high frequency, the low-noise amplifier circuit can be provided with a low frequency dependency of gain. Such structure is suitable for the amplification of a received signal in a multi-band communications system. If the gain difference is 0.5 dB or less in two or more frequency bands, it is possible to obtain a high-frequency circuit having an excellent receiving circuit for multi-band communications, for instance, two communications systems for 2.4-GHz-band wireless LAN (IEEE802.11b and/or IEEE802.11g) and 5-GHz-band wireless LAN (IEEE802.11a and/or IEEE802.11h). On the contrary, the conventional low-noise amplifier circuit shown in FIG. 23, which has a capacitor CL12 disposed in a feedback circuit, has a mountain or peak in its gain characteristics, poor in wideband characteristics.

In the low-noise amplifier circuit shown in FIG. 5, an emitter of the transistor 1 is grounded. A power source terminal Vcc for supplying DC current is connected to the output path via an inductance element LL11. The inductance element LL11 acts as a choke inductor, and its combination with the grounded capacitor CL14 prevents a high-frequency signal in a passband from leaking to the power source. A control power source terminal Vb is connected between the capacitor CL11 in the input path and the base via a resistor RL11. The resistor RL11 adjusts the operating point of the low-noise amplifier circuit. Further, a DC-cutting capacitor CL12 is connected between the node of the input path 3 and the input terminal In-LNA, and a DC-cutting capacitor CL13 is connected between the node of the output path 2 and the output terminal Out-LNA.

Figure 6:
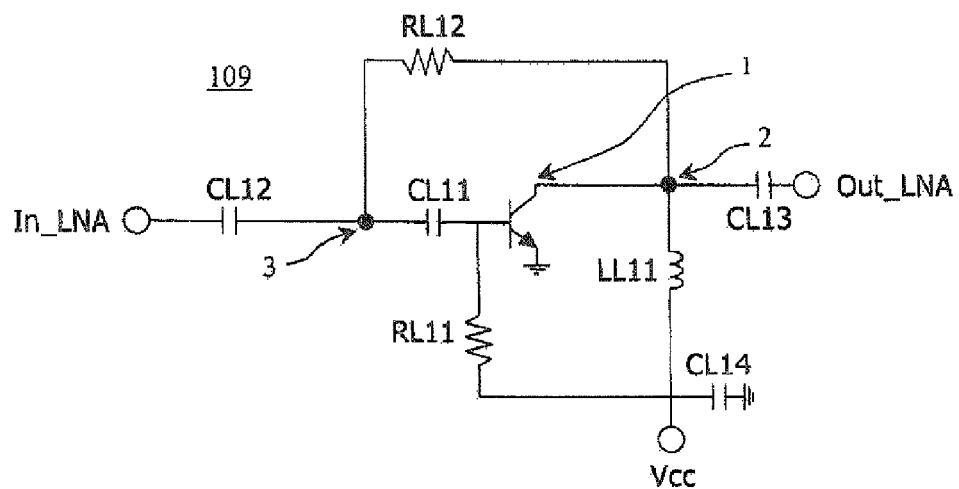
FIG. 6 is a view showing the equivalent circuit of a further example of the low-noise amplifier circuit used in the high-frequency circuit of the present invention.
Figure 7:
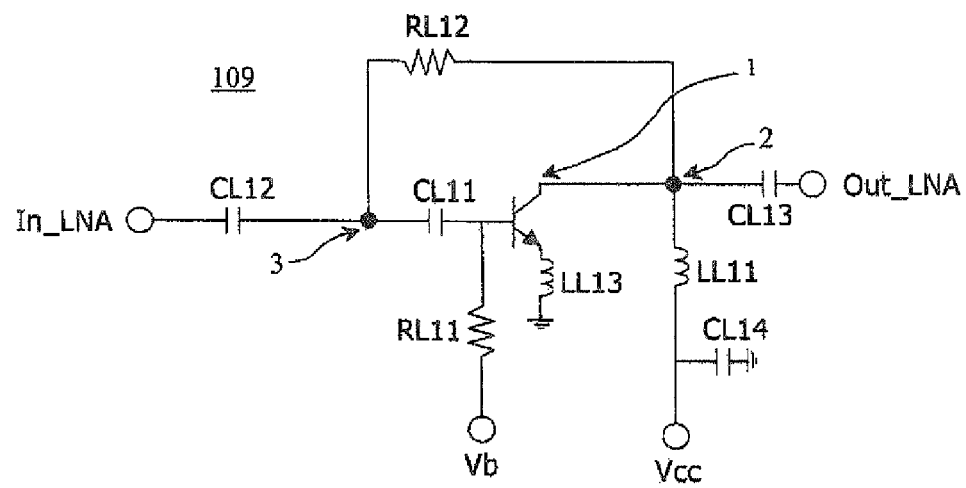
FIG. 7 is a view showing the equivalent circuit of a still further example of the low-noise amplifier circuit used in the high-frequency circuit of the present invention.

The supply power source and the control power source are not restricted to have the structures shown in FIG. 5, but may have other structures. As shown in FIG. 6, for instance, the supply power source terminal Voc may be connected to the input path via the resistor RL11 and to the output path via the inductance element LL11, so that one power source terminal Vcc may be commonly used as a supply power source and a control power source. With this structure, the ON/OFF control of the low-noise amplifier circuit can be performed by one power source, resulting in a simplified, small, low-cost circuit. As shown in FIG. 7, the emitter of the transistor 1 may be grounded via an inductance element LL13. The inductance adjustment of the inductance element LL13 enables the control of a frequency dependency of gain and input/output matching.

As shown in FIGS. 5 and 6, the DC-cutting capacitor CL12 is disposed in the input path on the opposite side of the capacitor CL 11 relative to the node 3. The capacitor CL11 is provided with smaller capacitance than that of the DC-cutting capacitor CL12. Although the capacitance of the DC-cutting capacitor CL 12 is set such that the capacitor CL 12 may be regarded as being short-circuited in a used frequency band, the capacitance of the capacitor CL11 is set such that the capacitor CL11 acts as an effective capacitor in a used frequency band.

Figure 8:
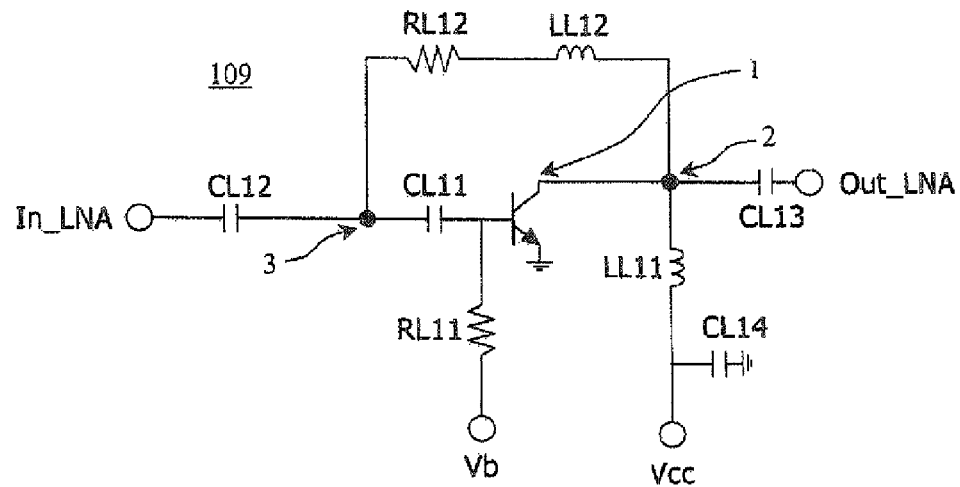
FIG. 8 is a view showing the equivalent circuit of a still further example of the low-noise amplifier circuit used in the high-frequency circuit of the present invention.

FIG. 8 shows a low-noise amplifier circuit according to another embodiment of the present invention, In this low-noise amplifier circuit, an inductance element LL12 is connected in series to a resistor RL12 in a feedback circuit. Because the inductance element has large impedance at a high frequency, the amount of feedback is smaller at a high frequency than at a low frequency, so that it has high gain characteristics at a high frequency, thereby flattening the frequency dependency of gain. To increase the gain and flatten its frequency dependency, the inductance element LL12 desirably has a higher self-resonance frequency than the passband, and a Q value of 10 or more in the passband. The use of this low-noise amplifier circuit suppresses the gain difference of the low-noise amplifier circuit in different frequency bands to, for instance, 5 dB or less.

The low-noise amplifier circuits shown in FIGS. 4-8 may be used not only in the high-frequency circuit shown in FIG. 1, but also in various high-frequency circuits having a function of amplifying received signals. For instance, in a high-frequency circuit for use in a multi-band (dual-band, triple-band, etc.) wireless apparatus selectively using different frequency bands, which comprises an antenna terminal connected to an antenna capable of transmitting and receiving signals in different frequency bands, two or more transmitting terminals to which transmitting signals in different frequency bands are inputted, two or more receiving terminals outputting received signals in different frequency bands, a switch circuit for switching the connection of the antenna terminal to the transmitting terminals or the receiving terminals, and diplexer circuits disposed between the switch circuit and the two or more receiving terminals, the above low-noise amplifier circuit may be disposed between the switch circuit and the diplexer circuit. In this case, the detection circuit, the lowpass filter circuit, etc. shown in FIG. 1 may or may not be provided, without restriction in their arrangement.

Figure 9:
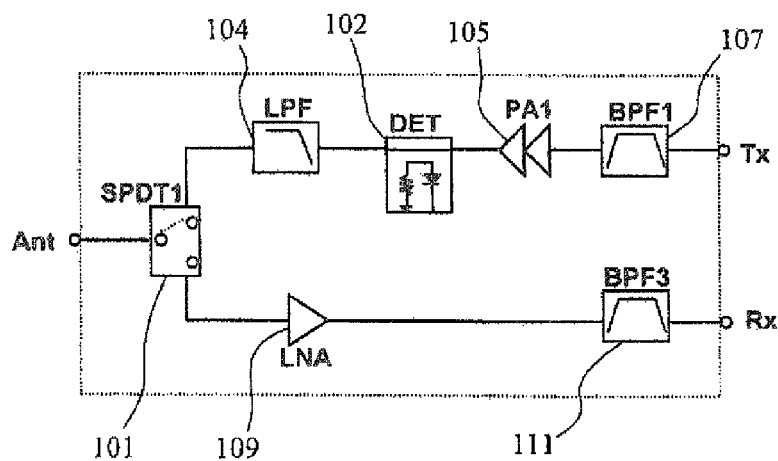
FIG. 9 is a block diagram showing a high-frequency circuit according to another embodiment of the present invention.

This low-noise amplifier circuit may be used in a high-frequency circuit for a single-band, wireless apparatus. FIG. 9 shows a high-frequency circuit for use in a single-band wireless apparatus. This high-frequency circuit comprises an antenna terminal Ant connected to an antenna capable of transmitting and receiving signals, a transmitting terminal Tx to which a transmitting signal is inputted, a receiving terminal Rx outputting a received signal, and a switch circuit 101 for switching the connection of the antenna terminal Ant to the transmitting terminal Tx or the receiving terminal PRx. The low-noise amplifier circuit 109 of the present invention is disposed between the switch circuit 101 and the receiving terminal Rx. A lowpass filter circuit 104 is connected between the switch circuit 101 and the detection circuit 102. Because the other structure is the same as shown in FIG. 1, its explanation will be omitted.

Figure 10:
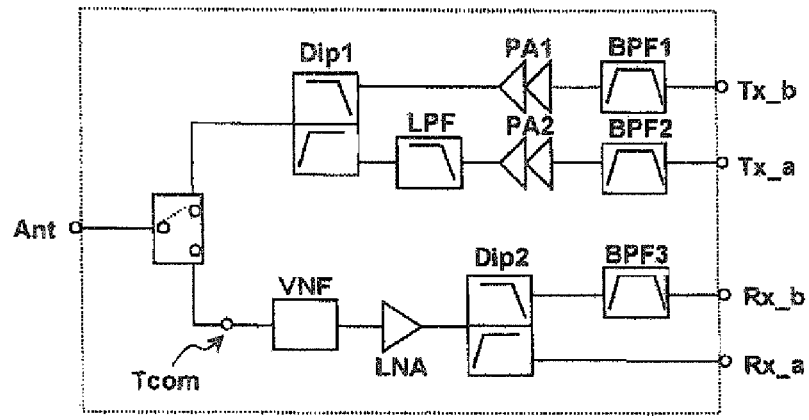
FIG. 10 is a block diagram showing a high-frequency circuit according to a further embodiment of the present invention.
Figure 11A:
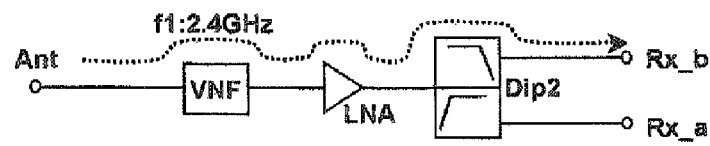
FIG. 11(a) is a block diagram showing the function of a variable notch filter circuit used in the high-frequency circuit of the present invention.
Figure 11B:
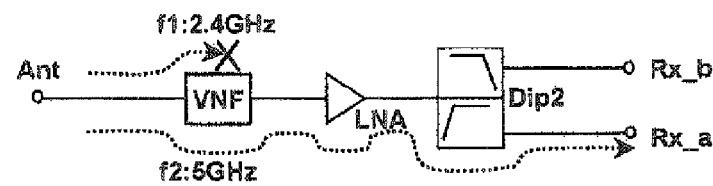
FIG. 11(b) is a block diagram showing the function of a variable notch filter circuit used in the high-frequency circuit of the present invention.

FIG. 10 shows a high-frequency circuit according to another embodiment of the present invention. This high-frequency circuit has a similar structure to that of the high-frequency circuit shown in FIG. 1, except for having a variable notch filter circuit VNF on the input side of the low-noise amplifier circuit (LNA). The variable notch filter circuit VNF can adjust the position of an attenuation pole by control input from outside. The variable notch filter circuit VNF passes a first frequency band f1 (2.4 GHz) when a signal in the first frequency band is received as shown in FIG. 11(*a*), but blocks the first frequency band f1 when a signal in a second frequency band f2 (5 GHz) is received as shown in FIG. 11(*b*). Thus, the variable notch filter circuit VNF blocks a signal in part of two or more communications systems used, though it can be provided with a function to block any unnecessary signals outside the band used. Accordingly, the variable notch filter circuit VNF prevents signals in different frequency bands from entering into the low-noise amplifier circuit (LNA), thereby avoiding distortion due to the interference of different signals, This is different from the conventional usage for simply reducing unnecessary harmonics.

Figure 12:
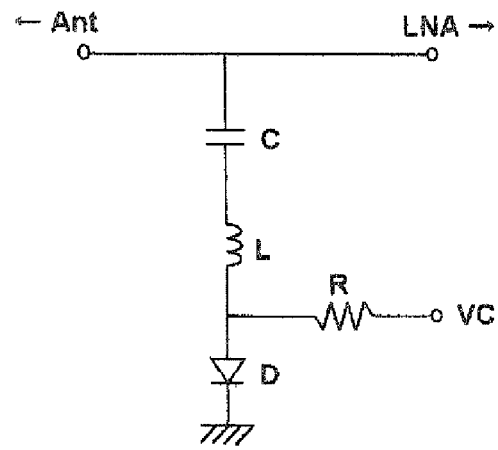
FIG. 12 is a view showing one example of the variable notch filter circuit used in the high-frequency circuit of the present invention.

FIG. 12 shows one structural example of the above variable notch filter circuit VNF. The variable notch filter circuit VNF comprises a capacitor C having one end connected to a path of a received signal, an inductance element L having one end connected in series to the capacitor C, a switch circuit D having one end connected in series to the inductance element L and the other end grounded, a resistor R having one end connected to a node between the inductance element L and the switch circuit D, and a voltage terminal VC connected to the other end of the resistor R for applying voltage to the switch circuit D. By the ON/OFF control of the switch circuit D using bias voltage applied from the voltage terminal VC, the attenuation pole of the variable notch filter circuit VNF can be adjusted.

Figure 13:
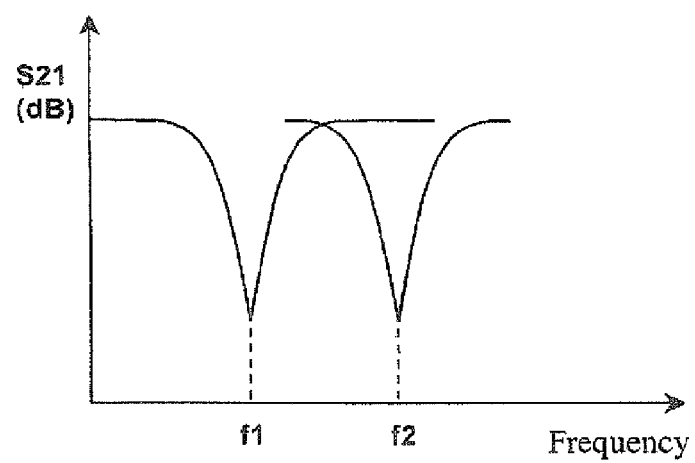
FIG. 13 is a graph schematically showing the S21-frequency characteristics of a variable notch filter circuit used in the high-frequency circuit of the present invention.

The switch circuit D may be constituted by an FET (field-effect transistor) or a diode. The switch circuit D constituted by FET can perform high-speed switching by low-driving current, while the switch circuit D constituted by a diode is small, inexpensive and commercially available. A small diode having as small capacitance as about 0.3-0.5 pF during OFF, such as a PIN diode, may be preferably selected as the diode. The PIN diode acts as an element having extremely small inductance of about 0.1 nH during ON. With the capacitor C of about 2 pF and the inductance element L of about 1 nH, for instance, the ON/OFF control of the diode changes ant LC resonance frequency, exhibiting transmission characteristics (S parameter S21) shown in, for instance, FIG. 13. A center frequency of the attenuation pole is f1 (2.4 GHz) when the diode is ON, and f2 (5 GHz) when the diode is OFF. Accordingly, when the first frequency band f1 is received, the diode is turned off such that the variable notch filter circuit VNF passes the first frequency band. On the other hand, when the second frequency band f2 is received, the diode is turned on such that the first frequency band f1 is attenuated. Thus, a high-frequency circuit for dual-band wireless LAN using frequency bands of 2.40 Hz and 5 GHz can be obtained. Although f2 need not be 5 GHz, the setting of f2 to 5 GHz prevents unnecessary signals in the frequency f2 from entering into the low-noise amplifier circuit (LNA) to distort a signals in the first frequency band f1.

When the variable notch filter circuit is used, the center frequencies f1, f2 of the first and second frequency bands need not be 2.4 GHz and 5 GHz, respectively, but may be a combination of any frequencies. The variable notch filter circuit may be used in multi-band (triple-band or more) communications. The blocking band of the variable notch filter circuit VNF is not restricted to a 2.4-GHz band, but may be 2.6-GHz and 3.5-GHz bands used in WiMAX as the first and second frequency bands.

The variable notch filter circuit VNF may be used widely in high-frequency circuits having a function of amplifying received signals, for instance, a high-frequency circuit for a receiving module based on a receiving path a high-frequency circuit additionally having a transmitting path for transmitting and receiving signals, etc. In this case, the detection circuit, the lowpass filter circuit, etc. may or may not be contained, with any arrangement. For instance, a variable notch filter circuit VNF passing a signal in the first frequency band when the signal in the first frequency band is received, and blocking a signal in the first frequency band when a signal in, the second frequency band is received, may be connected between a common terminal (Tcom) and the low-noise amplifier circuit (LNA), and a diplexer circuit (Dip2) for branching signals in the first and second frequency bands may be disposed between the low-noise amplifier circuit (LNA) and the first and second receiving terminals (Rx-ab, Rx-b). A high-frequency switch circuit having at least tree ports for switching the connection of the antenna terminal to the transmitting terminal and the receiving terminal may be us in a high-frequency circuit having this structure, with the receiving-terminal-side port of the high-frequency switch circuit connected to the common terminal.

[2] High-Frequency Device

A high-frequency device according to each embodiment of the present invention will be explained referring to the drawings, and explanations of each high-frequency device are applicable to other high-frequency devices unless otherwise particularly mentioned.

Figure 14:
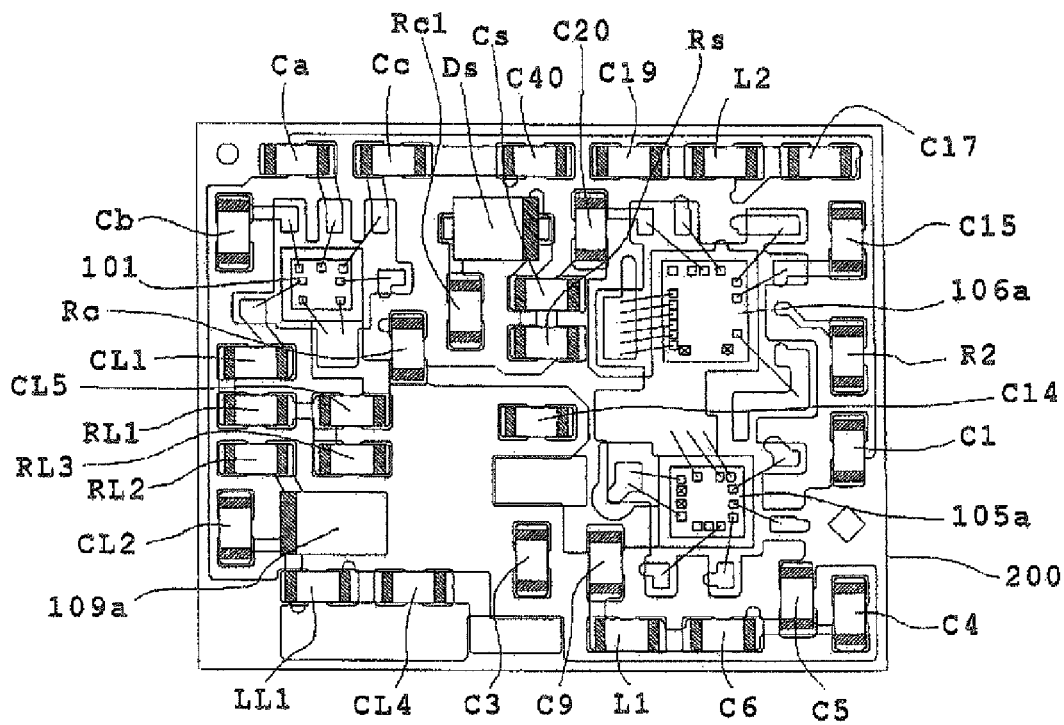
FIG. 14 is a plan view showing a high-frequency device according to one embodiment of the present invention.
Figure 15:
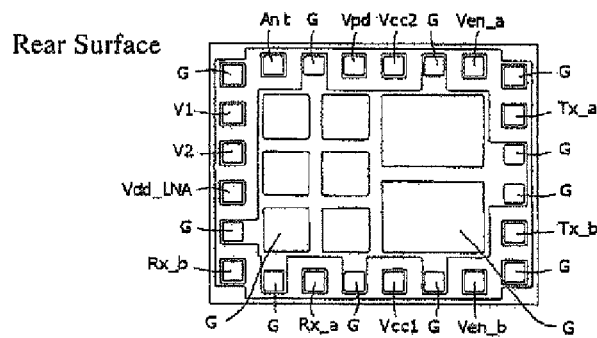
FIG. 15 is a bottom view showing a high-frequency device according to one embodiment of the present invention.
Figure 16:
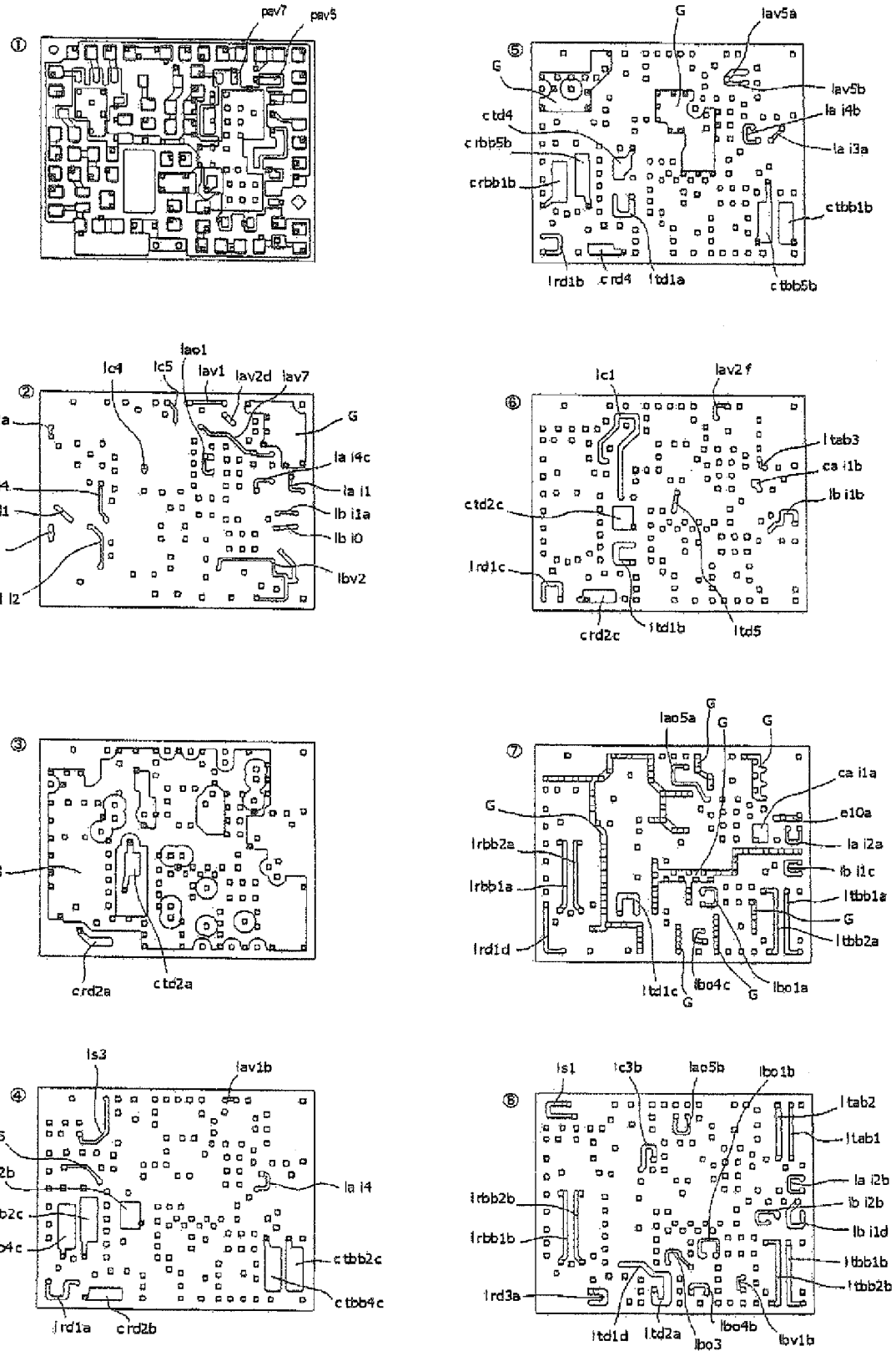
FIG. 16 is a development view showing part of ceramic substrates constituting the high-frequency device according to one embodiment of the present invention.
Figure 17:
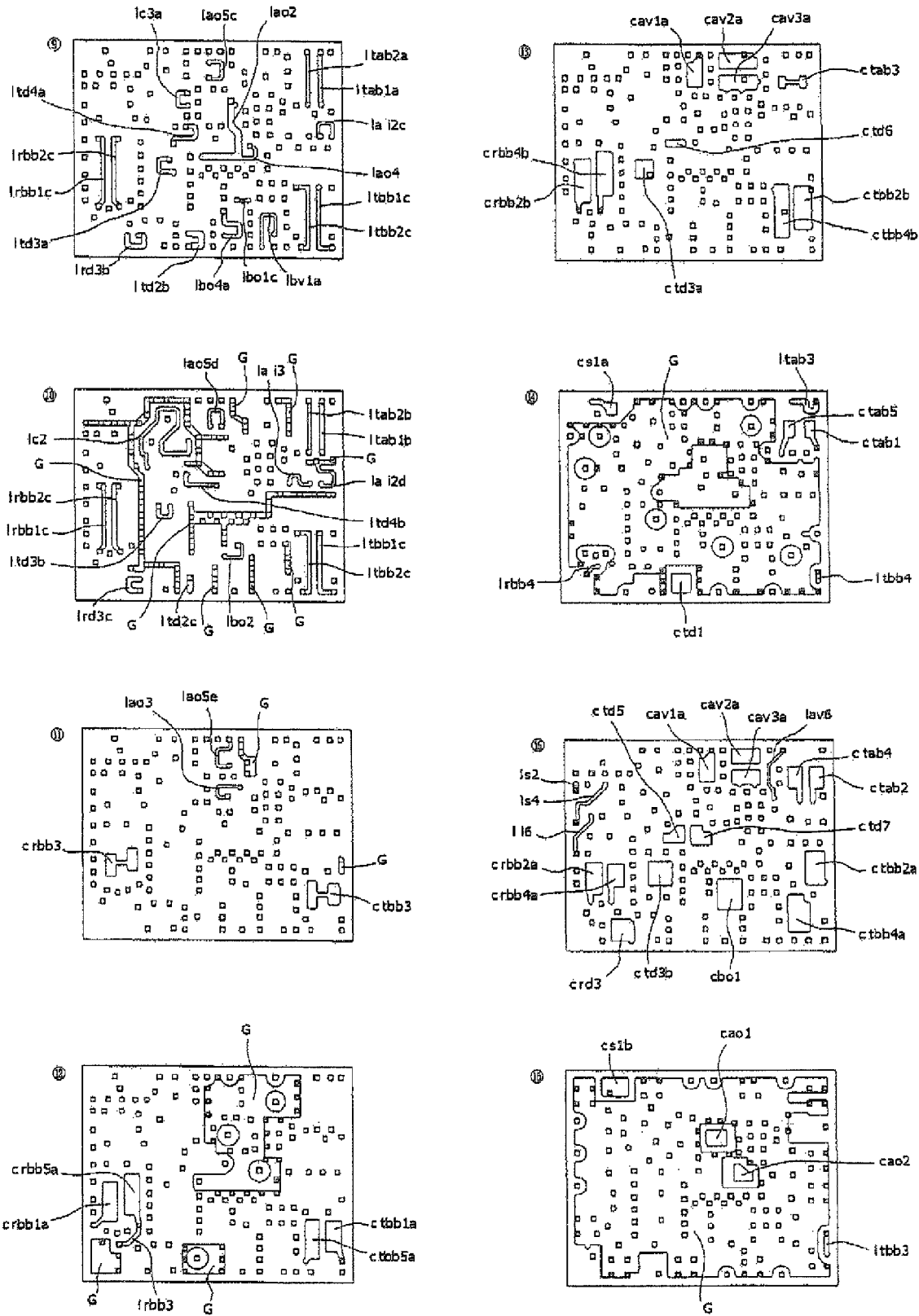
FIG. 17 is a development view showing the remaining part of ceramic substrates constituting the high-frequency device according to one embodiment of the present invention.

FIG. 14 shows a high-frequency device according to one embodiment of the present invention. This high-frequency device comprises a ceramic laminate substrate 200, and parts mounted thereon. FIG. 15 shows the arrangement of terminals on a bottom surface of the ceramic laminate substrate 200. FIGS. 16 and 17 show electrode patterns formed on each ceramic layer constituting the ceramic laminate substrate 200.

Because this high-frequency device constitutes the high-frequency circuit having the equivalent circuit shown in FIGS. 2-4, the same reference numerals as in FIGS. 2-4 are used. In the equivalent circuit shown in FIGS. 2-4, encircled elements are those mounted on the ceramic laminate substrate 200, having the same reference numerals as the mounted elements shown in FIG. 14.

A semiconductor element 105a of the first power amplifier circuit 105, a semiconductor element 106a of the second power amplifier circuit 106, and a semiconductor element of the switch circuit 101 are mounted on an upper surface of the ceramic laminate substrate 200 in the form of bare chips, and connected by wire bonding. These mounted parts are resin-molded on the ceramic laminate substrate 200 for insulation. Incidentally, capacitors Cd, Ce shown in FIG. 3 are mounted on a circuit board on which the high-frequency device is mounted. In the case of the high-frequency device having the variable notch filter circuit VNF, the variable notch filter circuit constituted by chip parts is preferably mounted on the ceramic laminate substrate 200.

The ceramic laminate substrate 200 can be produced, for instance, by printing a conductive paste comprising Ag, Cu, etc. having low resistivity on each green sheet as thick as 10-200 μm, which is made of dielectric ceramic materials sinterable at as low a temperature as 1000° C. or lower, such as low-temperature co-fired ceramics (LTCC), to form electrode patterns, laminating pluralities of green sheets, and integrally sintering them.

The dielectric ceramic materials may be, for instance, (a) ceramics comprising Al, Si and Sr as main components, and Ti, Bi, Cu, Mn, Na, K, etc as sub-components, (b) ceramics comprising Al, Si and Sr as main components, and Ca, Pb, Na, K, etc. as sub-components, (c) ceramics comprising Al, Mg, Si and Gd, (d) ceramic comprising Al, Si, Zr and Mg, etc. The dielectric ceramic materials preferably have dielectric constants of about 5-15. Apart from the dielectric ceramic materials, resins, or composites of resins and ceramic powder may be used. The ceramic substrate may be made of $Al_2O_3$-based, high-temperature co-fired ceramics (HTCC), and transmission lines, etc. may be made of high-temperature-sinterable metals such as tungsten, molybdenum, etc.

As FIGS. 16 and 17 show an uppermost layer et seq., the ceramic laminate substrate 200 comprises 16 layers. Each layer is produced by providing a ceramic green sheet with via-holes, filling the via-holes with a conductive paste to form via-hole electrodes, and printing a conductive paste to form electrode patterns.

Formed on an upper surface of a first layer (uppermost layer) are pluralities of land electrodes, on which chip parts, etc. not contained in the laminate substrate 200 are mounted, and each land electrode is connected to via-hole electrodes shown by symbols each constituted by a square containing a circle.

A second layer is provided with pluralities of line electrodes (111-114, etc.), a ground electrode G and via-hole electrodes.

A third layer is provided with electrodes crd2a, ctd2a for capacitors, a wide ground electrode G, and via-hole electrodes.

A fourth layer is provided with pluralities of line electrodes, pluralities of capacitor electrodes, and via-hole electrodes. The capacitor electrode crd2a on the third layer is opposing the capacitor electrode crd2b on the fourth layer, to constitute a capacitor crd2. This capacitor crd2 corresponds to a capacitor crd2 in the second diplexer circuit 110 shown in FIG. 2. Like this, reference numerals in the laminate are identical to those in the equivalent circuit. When one element (for instance, crd2) is constituted by pluralities of electrode patterns, electrode patterns are provided with reference numerals having a, b, etc., for instance, crd2a, crd2b.

A fifth layer and subsequent layers are provided with line electrodes, capacitor electrodes, ground electrodes, and via-hole electrodes bearing the same reference numerals as in the equivalent circuit. The line electrodes constituting inductance elements, and the capacitor electrodes constituting capacitors are connected through via-hole electrodes.

In portions of the ceramic laminate substrate 200, on which the semiconductor elements 105a, 106a for the power amplifier circuits are mounted, thermal vias for improving heat radiation are formed from the upper surface to the bottom surface. To suppress noise radiation, there are wide ground electrodes G, linear ground electrodes G and pluralities of via-hole electrodes connected to the ground electrodes arranged properly.

In the ceramic laminate substrate 200 having the high-frequency circuit three-dimensionally formed therein, an electrode pattern constituting each element is separated from that constituting the other element to avoid unnecessary electromagnetic interference, by ground electrodes G (wide ground electrodes, linear ground electrodes, and via-hole electrodes connected to these ground electrodes), or the electrode patterns are arranged such that they do not overlap each other in a lamination direction. More specifically, insufficient isolation among the input part of the high-frequency power amplifier the supply part of the power source and the output part tends to cause the malfunction and oscillation of the high-frequency power amplifier. Accordingly, to achieve sufficient isolation among these circuit blocks, planar ground electrodes and via-holes connected to these ground electrodes are properly arranged.

Figure 18:
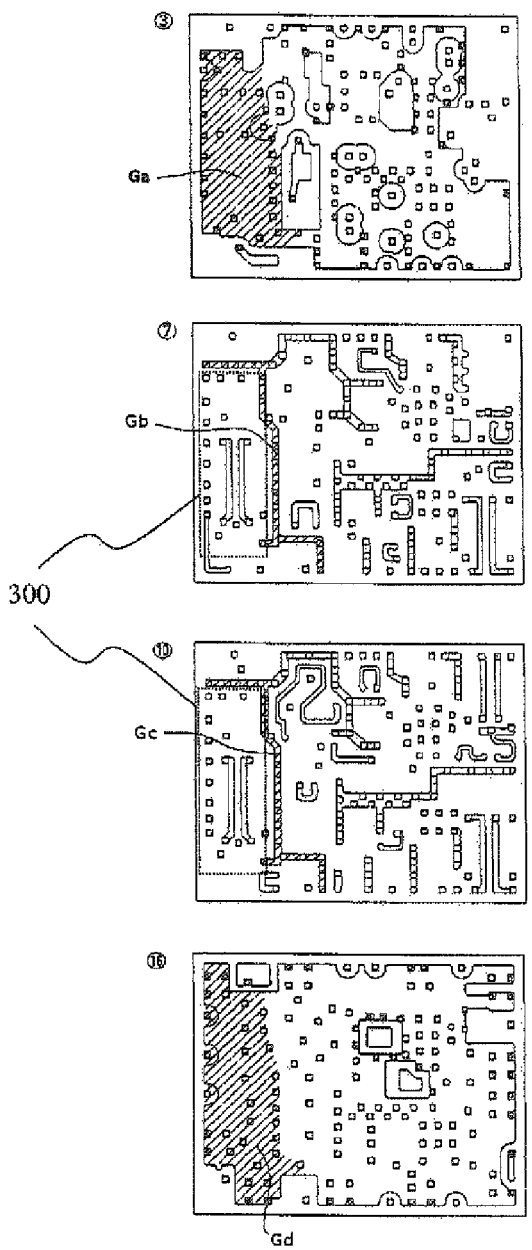
FIG. 18 is a development view showing part of ceramic substrates constituting the high-frequency device according to one embodiment of the present invention.

The second diplexer circuit 10 and the third bandpass filter circuit 111 on the receiving side are formed in the same region. As is clear from FIG. 18 showing electrode patterns on the third, seventh, 10-th and 16-th layers, this region has linear ground electrodes Gb, Gc (shown by hatching) formed by pluralities of via-hole electrodes on the seventh and 10-th layers, which are sandwiched by a ground electrode Ga (shown by hatching) on the third layer and a ground electrode Gd (shown by hatching) on the 16-th layer. When electrode patterns for the second diplexer circuit 110 and the third bandpass filter circuit 111 are arranged in the region (shown by 300 in FIG. 18) sandwiched by the ground electrodes Ga, Gd, interference is suppressed between these electrode patterns and electrode patterns for the other circuits, particularly those for the transmitting system.

The semiconductor elements 109a of the low-noise amplifier circuit 109 is mounted on the upper surface of the ceramic laminate substrate 200 just above the region 300, with a ground electrode (particularly the ground electrode Ga shown in FIG. 18) disposed between the semiconductor elements 109a and the region 300. To miniaturize the high-frequency device, the second diplexer circuit 110 and the third bandpass filter circuit 111 are preferably disposed, close to the low-noise amplifier circuit 109. However, when a signal input to the low-noise amplifier circuit 109 (a received signal inputted from the antenna) is interfered with the third bandpass filter circuit 111, gain reduction and oscillation, etc. are likely to occur. Accordingly, to suppress interference, a ground electrode is disposed between the low-noise amplifier circuit 109 and the third bandpass filter circuit 11.

Figure 19:
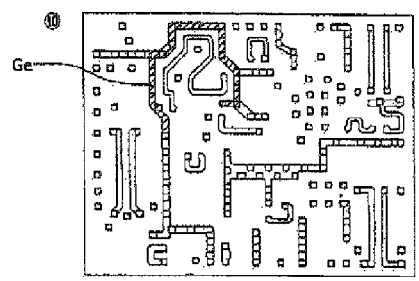
FIG. 19 is a plan view showing electrode patterns formed on a ceramic layer constituting the high-frequency device according to one embodiment of the present invention.

A main line lc1 and a sub-line lc2 constituting a coupler circuit in the detection circuit 102 are constituted by a line electrode lei on the sixth layer and a line electrode lc2 on the 10-th layer, respectively. The main line lc1 and the subline c2 are arranged in a lamination direction. The line electrodes lc1, lc2 are surrounded by the linear ground electrode (for instance, the linear ground electrode Ge shown by hatching in FIG. 19) and pluralities of via-hole electrodes connected to the ground electrode, and sandwiched by the ground electrode Ga on the third layer and the ground electrode Gd on the 14-th layer in a lamination direction. With the main line lc1 and the sub-line lc2 surrounded by the ground electrodes, interference with the other circuits is suppressed to constitute a coupler circuit with good coupling.

As shown in FIG. 15, pluralities of large ground electrodes G are disposed on a bottom surface of the ceramic laminate substrate 100 at a center, and the antenna terminal Ant1 the transmitting terminal Tx-b and the receiving terminal Rx-b for 2.4-GHz-band wireless LAN, the transmitting terminal Tx-a and the receiving terminal Rx-a for 5-GHz-band wireless LAN, the ground terminal G, control terminals V1, V2 for controlling the switch circuit, bias control terminals Ven-a, Ven-b for the power amplifier circuit, the voltage-applying terminals Vcc1, Vcc2, a control voltage terminal Vdd-LNA for the low-noise amplifier circuit, and an output terminal Vpd for the detection circuit are arranged along four sides. Although the terminal electrodes are in a land grid array (LbA) in this embodiment, a ball grid array (BGA), etc. may be used.

The ceramic laminate substrate 200 according to this embodiment can be made as small as 7 mm or less in each side (for instance, 6.5 mm×5.3 mm) in a planar size and 0.6 mm in thickness. The ceramic laminate substrate 200 can be as low as 1.3 mm even by bare-chip mounting and resin-sealing. Because the smallest conventional ceramic laminate substrates are about 9 mm×6 mm in a planar size, the mounting area has been able to be made as small as ⅔ or less.

The high-frequency device in this embodiment has good receiving sensitivity. Specifically, while a noise index is 3.5 d in a 2.4-GHz band and 4.0 dB in a 5-GHz band in the receiving path of a conventional high-frequency device comprising a diplexer circuit and a bandpass filter circuit on the input side of the low-noise amplifier, it is as small as 1.5 dB in a 2.4-GHz band and 1.8 dB in a 5-GHz band in the high-frequency device in this embodiment. The use of pluralities of such high-frequency devices can constitute a front-end part capable of switching pluralities of antennas and transmitting receiving paths, thereby providing a wireless-LAN communications apparatus with high speed and quality of communications, which is adapted to IEEE802.11n,

EXAMPLES 1 AND 2, AND COMPARATIVE EXAMPLE 1

Figure 20:
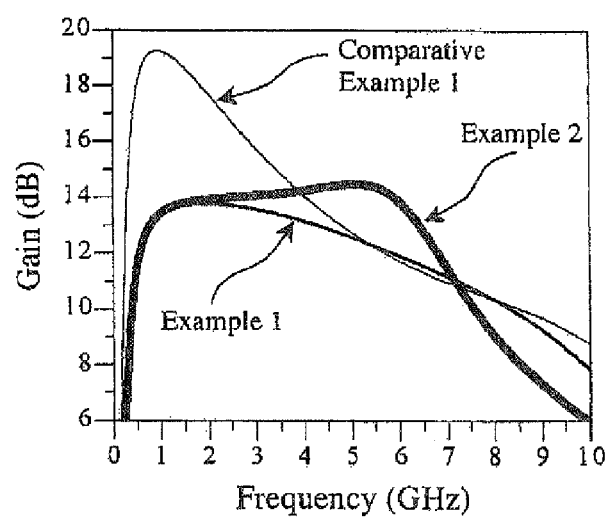
FIG. 20 is a graph showing the gain characteristics of the low-noise amplifier circuits of Examples 1 and 2 and Comparative Example 1.
Figure 21:
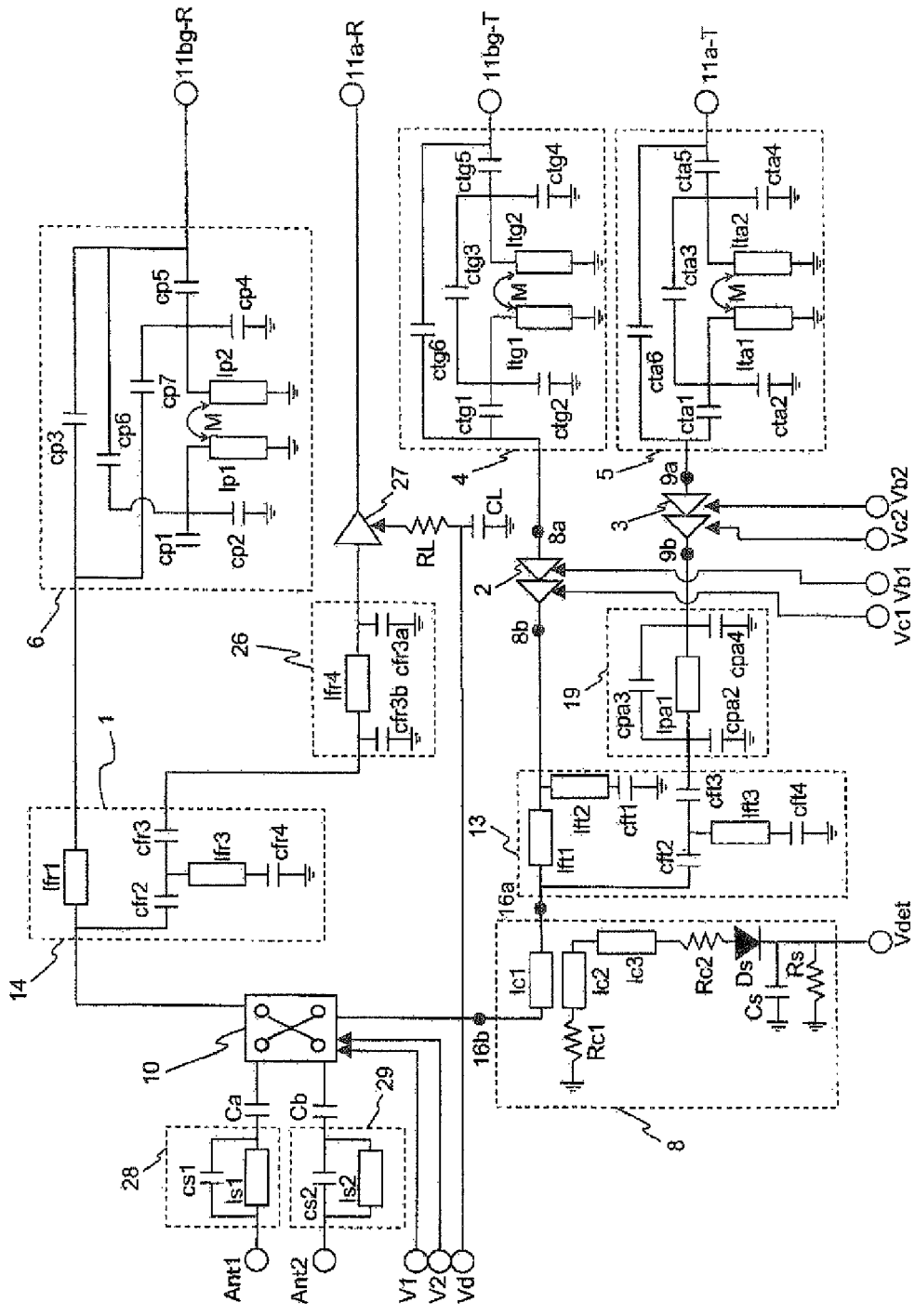
FIG. 21 is a view showing the equivalent circuit of one example of conventional high-frequency circuits.
Figure 22:
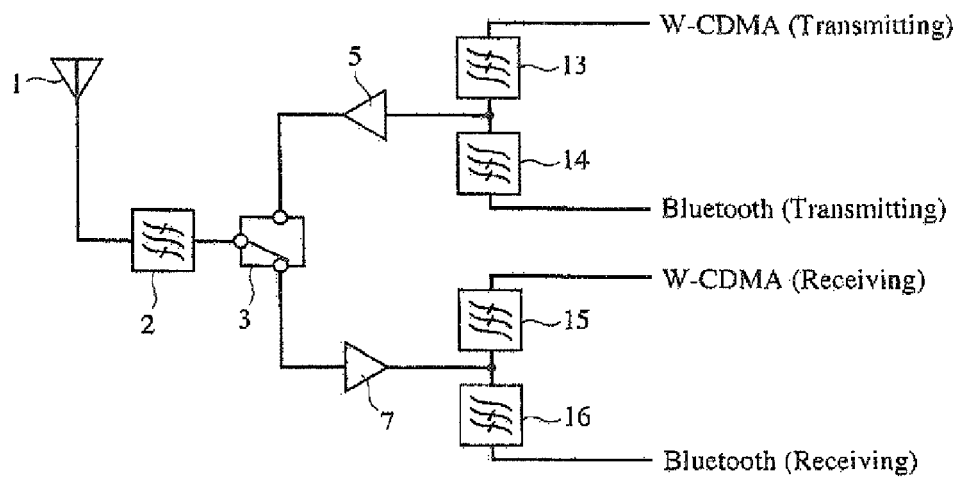
FIG. 22 is a block diagram showing another example of conventional high-frequency circuits.
Figure 23:
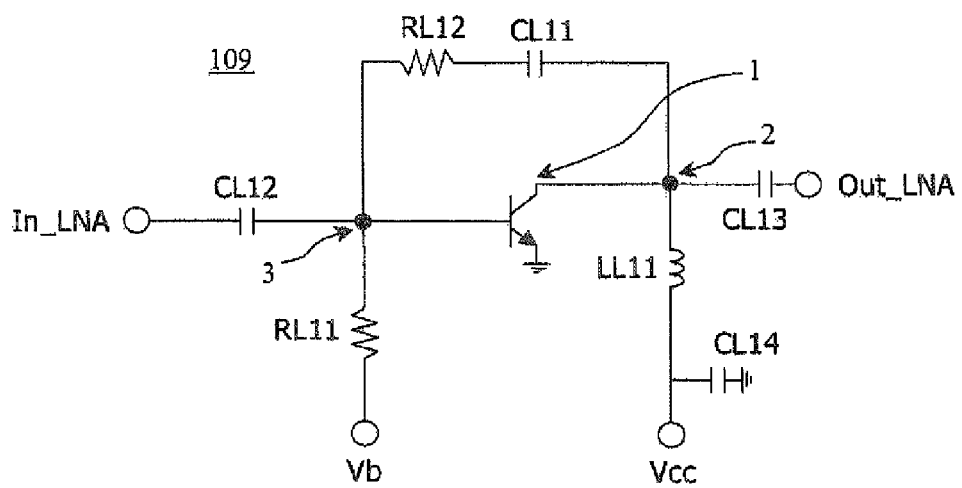
FIG. 23 is a view showing a conventional low-noise amplifier circuit.

The low-noise amplifier circuits (Examples 1 and 2, and Comparative Example 1) shown in FIGS. 5, 8 and 23 were constituted by circuit elements having constants shown in Table 1 below. Their gain characteristics are shown in FIG. 20.

TABLE 1

| Circuit Element | Example 1 (FIG. 5) | Example 2 (FIG. 8) | Comp. Ex. 1 (FIG. 23) |
|---|---|---|---|
| CL11 | 2 pF | 2 pF | 15 pF |
| RL12 | 560 Ω | 560 Ω | 560 Ω |
| CL12, CL13 | 15 pF | 15 pF | 15 pF |
| CL14 | 100 pF | 100 pF | 100 pF |
| RL11 | 56 kΩ | 56 kΩ | 56 kΩ |
| LL11 | 8.2 nH | 8.2 nH | 8.2 nH |
| LL12 | — | 3.9 nH | — |

In Comparative Example 1, the gain difference was as large as 5 dB in a frequency range of 2.4-5.85 GHz, and the signal-rising time by the ON/OFF control of the base voltage of the transistor was as long as 0.8 μsec. In Example 1, the gain was 12 dB or more in a frequency range of 2.4-5.85 GHz while suppressing increase in the gain in as low a frequency as 1-2 GHz, the gain difference was 2 dB or less, and the signal-rising time by the ON/OFF control of the base voltage of the transistor was as short as 0.1 sec. In Example 2 having the inductance element LL12 in the feedback circuit, the gain increased near 5 GHz, the gain difference was 1 dB or less, and the signal-rising time by the ON/OFF control of the base voltage of the transistor was as short as 0.1 sec. This indicates that the low-noise amplifier circuit used in the present invention has a small gain difference and excellent gain flatness. The low-noise amplifier circuit in Example 2 has a gain of 13 dB or more in a frequency range of 2.4-5.85 GHz.

EXAMPLES 3 AND 4

In the high-frequency device of Example 3 comprising the high-frequency circuit shown in FIG. 1 having no variable notch filter circuit, a signal of −15 dBm in a 2.4-GHz band was inputted into the low-noise amplifier circuit, and a second harmonic of −30 dBm was output from the receiving terminal of a 5-GHz band. On the other hand, in the high-frequency device of Example 4 comprising the high-frequency circuit shown in FIG. 10 having a variable notch filter circuit, harmonics output from the receiving terminal of 5-GHz band were reduced to −70 dm, preventing the deterioration of receiving sensitivity,

APPLICABILITY IN INDUSTRY

The high-frequency circuit (high-frequency device) of the present invention can be used in a small multi-band communications apparatus, for instance, for two communications systems of 2.4-GHz-band wireless LAN (IEEE802.11b and/or IEEE802.11g) and 5-GHz-band wireless LAN (IEEE802.11a and/or IEEE802.11h). The communications systems are not restricted to the above frequency bands and communications standards, but the switching of a multi-stage of high-frequency switch circuits can be adapted to, for instance, three or more communications systems. The multi-band communications apparatuses include, for instance, wireless communications apparatuses such as mobile phones, PCs, PC peripherals such as printers, hard disk drives and broadband rooters, home electronic apparatuses such as FAXs, refrigerators, standard televisions (SDTVs), high-definition televisions HDTVs), digital cameras and digital video cameras, etc.

What is claimed is:

1. A high-frequency circuit for use in a dual-band wireless apparatus performing wireless communications selectively using first and second frequency bands, comprising:
an antenna terminal connected to an antenna capable of transmitting and receiving signals in said first and second frequency bands;
a first transmitting terminal to which a transmitting signal in said first frequency band is inputted, a second transmitting terminal to which a transmitting signal in said second frequency band is inputted, a first receiving terminal outputting a received signal in said first frequency band, and a second receiving terminal outputting a received signal in said second frequency band;
a switch circuit for switching the connection of said antenna terminal to said first and second transmitting terminals or said first and second receiving terminals;
a first diplexer circuit disposed in a transmitting path between said switch circuit and said first and second transmitting terminals, and a second diplexer circuit disposed in a receiving path between said switch circuit and said first and second receiving terminal;
a first power amplifier circuit disposed between said first diplexer circuit and said first transmitting terminal, and a second power amplifier circuit disposed between said first diplexer circuit and said second transmitting terminal;
a first bandpass filter circuit disposed between said first power amplifier circuit and said first transmitting terminal, a second bandpass filter circuit disposed between said second power amplifier circuit and said second transmitting terminal, and a third bandpass filter circuit disposed between said second diplexer circuit and said first receiving terminal;
a detection circuit disposed between said switch circuit and said first diplexer circuit, said detection circuit being commonly used for said first and second power amplifier circuits, and a DC voltage based on output power of said first power amplifier circuit or said second power amplifier circuit being output from a detection output terminal of said detection circuit; and
a low-noise amplifier circuit disposed between said switch circuit and said second diplexer circuit, the input side of said low-noise amplifier being connected to said switch circuit without passing through any other diplexer circuit, said low-noise amplifier circuit being commonly used for receiving signals in said first and second frequency bands,
said low-noise amplifier circuit comprising:
a transistor,
an input terminal connected to a base of said transistor,
an output terminal connected to a collector of said transistor,
a feedback circuit having a resistor connected between an input path node disposed between said input terminal and the base of the transistor and the output terminal, and
a capacitor connected between the input path node and the base of said transistor,
wherein the impedance of said capacitor is large at a low frequency and small at a high frequency in a passband of receiving signals,
a capacitance of said capacitor is set such that said capacitor acts as an effective capacitor in said first and second frequency bands, to flatten the gain characteristics of said low-noise amplifier circuit, and
an emitter of said transistor is grounded.

2. The high-frequency circuit according to claim 1, wherein said feedback circuit further comprises an inductance element in series to said resistor.

3. The high-frequency circuit according to claim 1, wherein the emitter of said transistor is grounded via an inductance element.

4. A communications apparatus comprising the high-frequency circuit recited in claim 1.

5. A high-frequency device comprising the high-frequency circuit recited in claim 1.

6. The high-frequency circuit according to claim 1, wherein the low-noise amplifier circuit further comprises:
a first DC-cutting capacitor connected to the capacitor between the input terminal and the input path node, a capacitance of said first DC-cutting capacitor being set such that the capacitor is regarded as being short-circuited in said first and second frequency bands, wherein said capacitor has a smaller capacitance value than that of said first DC-cutting capacitor.

7. The high-frequency circuit according to claim 6, wherein the low-noise amplifier circuit further comprises:
a second DC-cutting capacitor connected to the resistor between the output terminal and the collector of the transistor.

8. The high-frequency circuit according to claim 1, wherein the emitter of the transistor is grounded to receive 0V, and
the collector of the transistor is connected to a power source to receive DC power.

9. The high-frequency circuit according to claim 8, wherein a current flows from the collector to the emitter and into ground, when the collector receives the DC power from the power source.

* * * * *